(12) United States Patent
Tanio

(10) Patent No.: US 12,160,254 B2
(45) Date of Patent: Dec. 3, 2024

(54) PARAMETER CHANGING DEVICE, PARAMETER CHANGING METHOD, AND NON-TRANSITORY COMPUTER READABLE MEDIUM

(71) Applicant: NEC Corporation, Tokyo (JP)

(72) Inventor: Masaaki Tanio, Tokyo (JP)

(73) Assignee: NEC CORPORATION, Tokyo (JP)

( * ) Notice: Subject to any disclaimer, the term of this patent is extended or adjusted under 35 U.S.C. 154(b) by 23 days.

(21) Appl. No.: 18/197,359

(22) Filed: May 15, 2023

(65) Prior Publication Data

US 2023/0378984 A1    Nov. 23, 2023

(30) Foreign Application Priority Data

May 19, 2022    (JP) .................................. 2022-082401

(51) Int. Cl.
*H04B 1/04*    (2006.01)
*H04B 17/15*   (2015.01)

(52) U.S. Cl.
CPC .......... *H04B 1/0475* (2013.01); *H04B 17/15* (2015.01); *H04B 2001/0425* (2013.01)

(58) Field of Classification Search
CPC ................ H04B 1/0475; H04B 17/15; H04B 2001/0425
See application file for complete search history.

(56) References Cited

U.S. PATENT DOCUMENTS

| 6,882,217 B1 * | 4/2005 | Mueller ................ H03F 1/3241 330/149 |
| 2010/0097137 A1 * | 4/2010 | Hou ......................... H03F 3/24 330/149 |

(Continued)

FOREIGN PATENT DOCUMENTS

| JP | 2015-005965 A | 1/2015 |
| WO | 2021/054118 A1 | 3/2021 |

OTHER PUBLICATIONS

J. Kim, K. Konstantinou, "Digital Predistortion of wideband signals based on power amplifier model with memory", IET Electron Letter, vol. 37 No. 23, pp. 1417-1418, Nov. 2001.

(Continued)

*Primary Examiner* — David S Huang
(74) *Attorney, Agent, or Firm* — Sughrue Mion, PLLC

(57) ABSTRACT

A parameter changing device according to the present disclosure includes: a multiplier multiplying a test signal by a back-off rate; a first distortion compensation simulation unit performing distortion compensation processing on a signal acquired by the multiplication, by using a stored parameter; a scaling unit scaling an output signal of the first distortion compensation simulation unit; a second distortion compensation simulation unit performing distortion compensation processing on the test signal, by using a parameter different from the first distortion compensation simulation unit; a differential unit calculating an error between a value of a signal acquired by the scaling and a value of an output signal of the second distortion compensation simulation unit; an approximation error minimization unit calculating a parameter of the second distortion compensation simulation unit minimizing the error; and an output unit outputting a parameter of the second distortion compensation simulation unit to a distortion compensation unit.

8 Claims, 12 Drawing Sheets

(56) References Cited

U.S. PATENT DOCUMENTS

2014/0347132 A1* 11/2014 Kawasaki ............... H03F 3/24
330/291
2021/0320629 A1* 10/2021 Chang ................. H04B 1/0475

OTHER PUBLICATIONS

R. N. Braithwaite, "Closed-loop digital predistortion (DPD) using an observation path with limited bandwidth", IEEE Transaction on Microwave Theory and Techniques, vol. 63, No. 2, pp. 726-736, Feb. 2015.
Meenakshi Rawat, Fadhel M.Ghannouchi, "A Mutual Distortion and Impairment Compensator for Wideband Direct-Conversion Transmitters Using Neural Networks", IEEE Transaction on Broadcasting, vol. 58, No. 2, pp. 168-177, Jun. 2012.
M. Tanio, N. Ishii and N. Kamiya, "Efficient Digital Predistortion Using Sparse Neural Network", In IEEE Access, vol. 8, pp. 117841-117852, 2020.

\* cited by examiner

PARAMETER CHANGING DEVICE, PARAMETER CHANGING METHOD, AND NON-TRANSITORY COMPUTER READABLE MEDIUM

INCORPORATION BY REFERENCE

This application is based upon and claims the benefit of priority from Japanese patent application No. 2022-082401, filed on May 19, 2022, the disclosure of which is incorporated herein in its entirety by reference.

TECHNICAL FIELD

The present disclosure relates to a parameter changing device, a parameter changing method, and a non-transitory computer readable medium.

BACKGROUND ART

In a transmitter in a wireless communication system such as a mobile communication system, a radio signal is amplified by a power amplifier (hereinafter, referred to as "PA" as appropriate), and the amplified radio signal is transmitted to a receiver.

In addition, in a transmitter in a wireless communication system, in order to achieve large-capacity and high-efficiency communication, it is essential to provide a distortion compensation unit that performs distortion compensation processing of compensating for nonlinear distortion of a PA by using a parameter. As the distortion compensation unit, for example, a distortion compensation unit of a digital predistortion (DPD) system (for example, International Patent Publication No. WO2021/054118) is cited.

Meanwhile, in order to calculate an optimum parameter of the distortion compensation unit, a feedback circuit that performs feedback on an output signal of the PA is required (for example, Japanese Unexamined Patent Application Publication No. 2015-005965).

Herein, with reference to FIG. 12, a configuration example of a transmitter provided with a feedback circuit as a transmitter according to the related art is described.

A transmitter 90 illustrated in FIG. 12 includes a signal processing unit 91, a distortion compensation unit 92, a digital to analog converter (DA converter, hereinafter, referred to as "DAC" as appropriate) 93, a mixer 94, an oscillator 95, a PA 96, a transmission antenna 97, and a feedback circuit 98. In addition, the feedback circuit 98 includes a mixer 981, an analog to digital converter (AD converter, hereinafter, referred to as "ADC" as appropriate) 982, and a parameter update unit 983.

The distortion compensation unit 92 performs distortion compensation processing of compensating for nonlinear distortion of the PA 96 on an output signal of the signal processing unit 91, by using a parameter updated by the parameter update unit 983.

The DAC 93 performs DA conversion on an output signal of the distortion compensation unit 92 from a digital signal to an analog signal.

The mixer 94 up-converts an output signal of the DAC 93 from an intermediate frequency to a radio frequency by mixing the output signal with an oscillation signal of a local frequency generated by the oscillator 95.

The PA 96 amplifies an output signal of the mixer 94.

The transmission antenna 97 transmits an output signal of the PA 96 to a receiver (not illustrated).

The output signal of the PA 96 is performed feedback to the mixer 981. The mixer 981 down-converts the output signal of the PA 96 from the radio frequency to the intermediate frequency by mixing the output signal with the oscillation signal of the local frequency generated by the oscillator 95.

The ADC 982 performs AD conversion of an output signal of the mixer 981 from an analog signal to a digital signal.

The parameter update unit 983 updates a parameter of the distortion compensation unit 92, by using an output signal of the signal processing unit 91 and an output signal of the ADC 982.

However, when a feedback circuit is provided in a transmitter as in a technique described in Japanese Unexamined Patent Application Publication No. 2015-005965, there is a problem that a cost of the transmitter increases because an additional cost of the feedback circuit occurs and particularly an ADC is expensive.

SUMMARY

Therefore, in view of the above-described circumstance, an example object of the present disclosure is to provide a parameter changing device, a parameter changing method, and a non-transitory computer readable medium that are capable of changing a parameter of a distortion compensation unit without providing a feedback circuit.

In a first example aspect, a parameter changing device configured to change a parameter of a distortion compensation unit configured to perform distortion compensation processing of compensating for nonlinear distortion of an amplifier, includes:
  a multiplier configured to multiply a test signal to be input by a back-off rate to be input;
  a first distortion compensation simulation unit configured to perform distortion compensation processing on an output signal of the multiplier, by using a parameter stored in a parameter storage unit;
  a scaling unit configured to scale an output signal of the first distortion compensation simulation unit;
  a second distortion compensation simulation unit configured to perform distortion compensation processing on the test signal to be input, by using a parameter different from that of the first distortion compensation simulation unit;
  a differential unit configured to calculate an error between a value of an output signal of the scaling unit and a value of an output signal of the second distortion compensation simulation unit;
  an approximation error minimization unit configured to calculate a parameter of the second distortion compensation simulation unit so as to minimize the error calculated by the differential unit; and
  an output unit configured to output, to the distortion compensation unit, as a parameter of the distortion compensation unit, a parameter of the second distortion compensation simulation unit being calculated by the approximation error minimization unit.

In a second example aspect, a transmitter includes:
  the amplifier;
  the distortion compensation unit configured to perform distortion compensation processing of compensating for nonlinear distortion of the amplifier; and
  the parameter changing device configured to change a parameter of the distortion compensation unit.

In a third example aspect, a parameter changing method being provided by a parameter changing device configured to change a parameter of a distortion compensation unit configured to perform distortion compensation processing of compensating for nonlinear distortion of an amplifier, includes:

inputting a back-off rate and a test signal;
    multiplying the test signal by the back-off rate;
    in a first distortion compensation simulation unit, performing distortion compensation processing on a signal acquired by the multiplication, by using a parameter stored in a parameter storage unit;
    scaling an output signal of the first distortion compensation simulation unit;
    in a second distortion compensation simulation unit, performing distortion compensation processing on the test signal, by using a parameter different from that of the first distortion compensation simulation unit;
    calculating an error between a value of a signal acquired by the scaling and a value of an output signal of the second distortion compensation simulation unit;
    calculating a parameter of the second distortion compensation simulation unit so as to minimize the calculated error; and
    outputting, to the distortion compensation unit, as a parameter of the distortion compensation unit, the calculated parameter of the second distortion compensation simulation unit.

In a fourth example aspect, a non-transitory computer readable medium stores a program for causing a computer to change a parameter of a distortion compensation unit configured to perform distortion compensation processing of compensating for nonlinear distortion of an amplifier, and the program includes:

inputting a back-off rate and a test signal;
    multiplying the test signal by the back-off rate;
    in a first distortion compensation simulation unit, performing distortion compensation processing on a signal acquired by the multiplication, by using a parameter stored in a parameter storage unit;
    scaling an output signal of the first distortion compensation simulation unit;
    in a second distortion compensation simulation unit, performing distortion compensation processing on the test signal, by using a parameter different from that of the first distortion compensation simulation unit;
    calculating an error between a value of a signal acquired by the scaling and a value of an output signal of the second distortion compensation simulation unit;
    calculating a parameter of the second distortion compensation simulation unit so as to minimize the calculated error; and
    outputting, to the distortion compensation unit, as a parameter of the distortion compensation unit, the calculated parameter of the second distortion compensation simulation unit.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Hereinafter, example embodiments of the present disclosure will be described with reference to the drawings. Note that, the following description and the drawings are omitted and simplified as appropriate for clarifying of description. In addition, in the following drawings, the same elements are denoted by the same reference signs, and redundant descriptions are omitted as necessary.

First Example Embodiment

First, a configuration example of a transmitter 10 according to a first example embodiment will be described with reference to FIG. 1.

Figure 1:
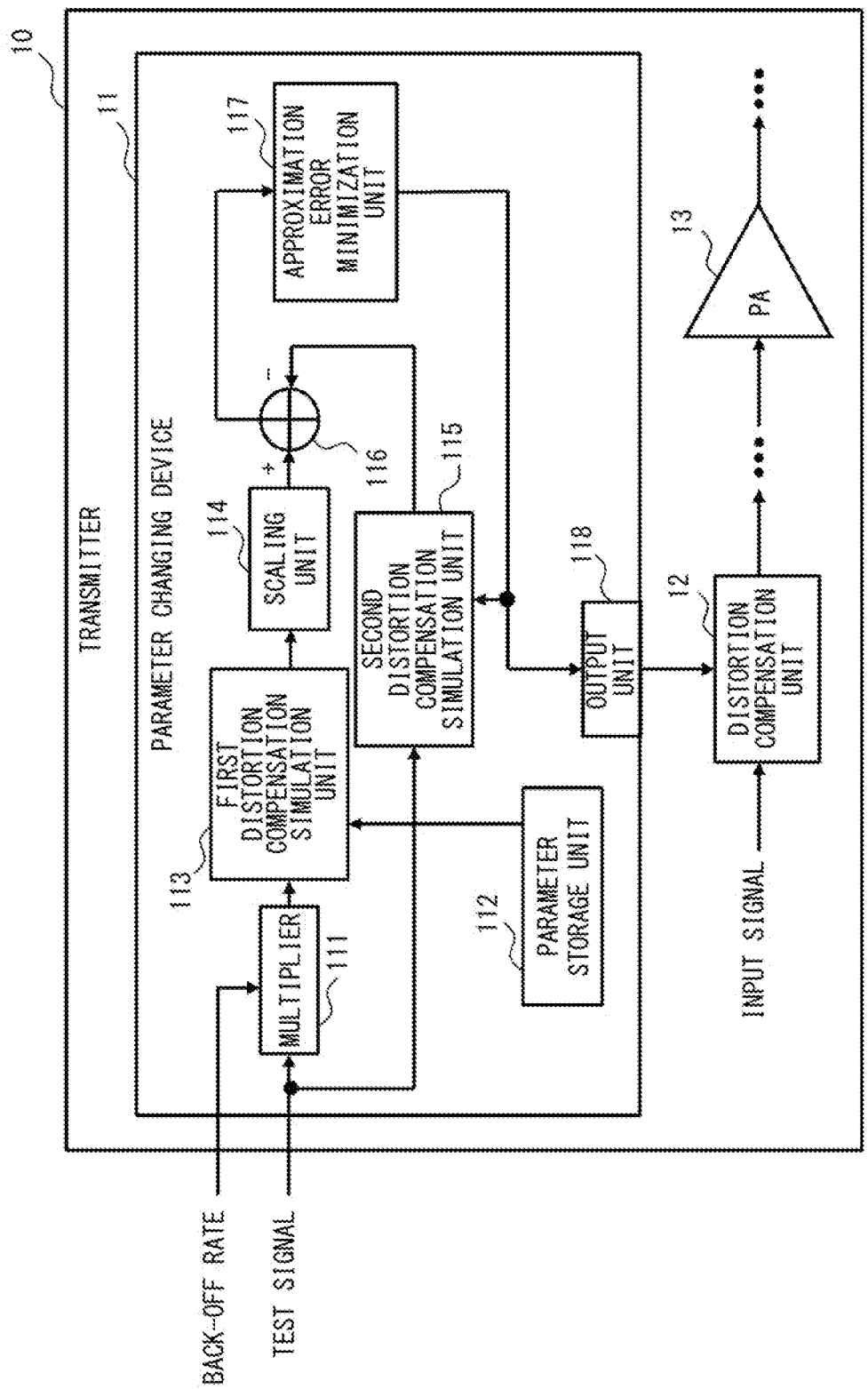
FIG. 1 is a diagram illustrating a configuration example of a transmitter according to a first example embodiment.

As illustrated in FIG. 1, the transmitter 10 according to the first example embodiment includes a parameter changing device 11, a distortion compensation unit 12, and a PA 13.

Figure 12:
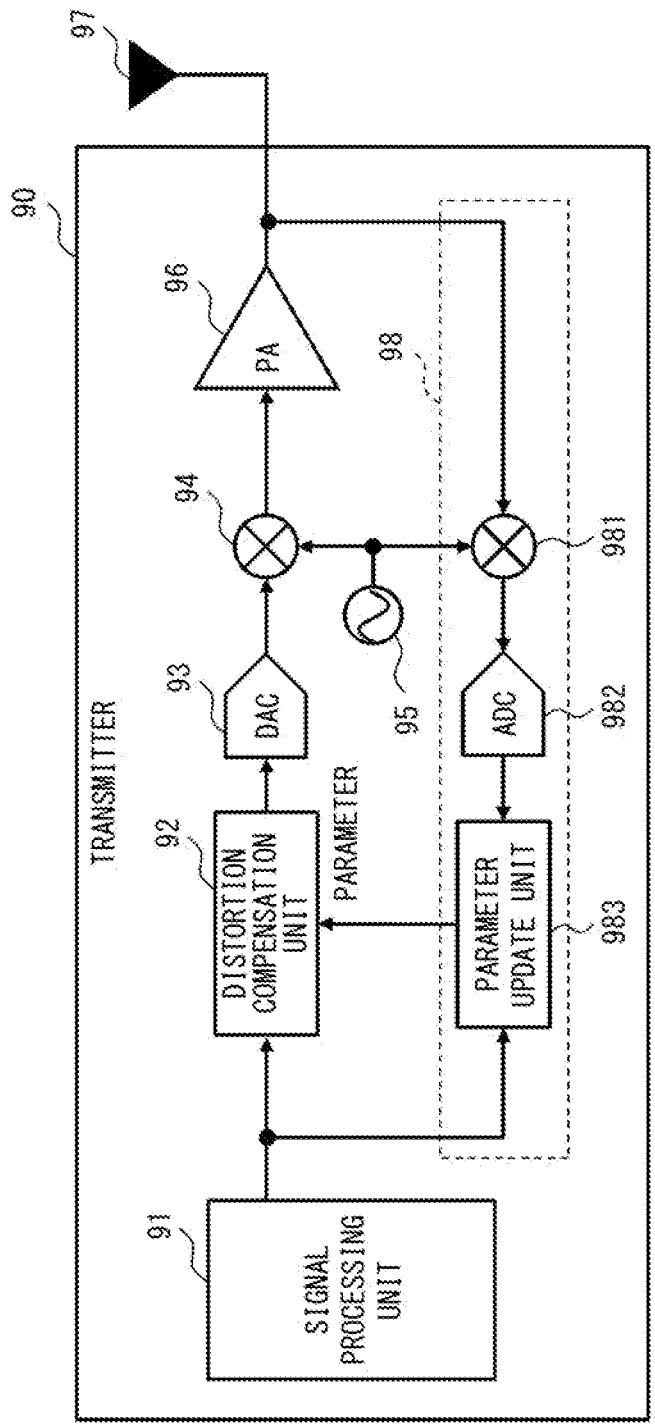
FIG. 12 is a diagram illustrating a configuration example of a transmitter according to the related art.

Note that, in addition to the components illustrated in FIG. 1, the transmitter 10 includes components corresponding to a signal processing unit 91, a DAC 93, a mixer 94, an oscillator 95, and a transmission antenna 97 illustrated in FIG. 12, but these components are not essential components of the present disclosure, and thus are omitted in FIG. 1.

The distortion compensation unit 12 and the PA 13 correspond to a distortion compensation unit 92 and a PA 96 illustrated in FIG. 12, respectively.

Therefore, an input signal to be input to the distortion compensation unit 12 corresponds to an output signal of the signal processing unit 91 illustrated in FIG. 12. The distortion compensation unit 12 performs distortion compensation processing of compensating for nonlinear distortion of the PA 13 on the input signal by using a parameter. The distortion compensation unit 12 is, for example, a distortion compensation unit of a DPD system. In addition, a signal to be input to the PA 13 corresponds to an output signal of the mixer 94 illustrated in FIG. 12. The PA 13 amplifies the signal.

The parameter changing device 11 is a device that changes a parameter of the distortion compensation unit 12 by using a back-off rate of the PA 13 and a test signal to be input, and outputs the changed parameter to the distortion compensation unit 12.

The parameter changing device 11 includes a multiplier 111, a parameter storage unit 112, a first distortion compensation simulation unit 113, a scaling unit 114, a second distortion compensation simulation unit 115, a differential unit 116, an approximation error minimization unit 117, and an output unit 118.

The multiplier 111 multiplies a test signal to be input by a back-off rate of the PA 13 to be input.

The parameter storage unit 112 stores a parameter of the first distortion compensation simulation unit 113.

The first distortion compensation simulation unit 113 performs distortion compensation processing on an output signal of the multiplier 111, by using a parameter stored in the parameter storage unit 112.

The second distortion compensation simulation unit 115 performs distortion compensation processing on a test signal to be input, by using a parameter different from that of the first distortion compensation simulation unit 113.

The first distortion compensation simulation unit 113 and the second distortion compensation simulation unit 115 perform distortion compensation processing in common with the distortion compensation unit 12 except that a parameter to be used are different. Therefore, the first distortion compensation simulation unit 113 and the second distortion compensation simulation unit 115 are also distortion compensation units of the DPD system, for example.

In addition, the distortion compensation unit 12, the first distortion compensation simulation unit 113, and the second distortion compensation simulation unit 115 may be configured by a memory polynomial. A distortion compensation unit of the DPD system configured by a memory polynomial is described in, for example, Non Patent Literature 1.

Non Patent Literature 1

J. Kim, K. Konstantinou, "Digital Predistortion of wideband signals based on power amplifier model with memory", IET Electron Ketter, Vol. 37 No. 23, pp. 1417-1418, November 2001

The scaling unit 114 scales an output signal of the first distortion compensation simulation unit 113.

The differential unit 116 calculates an error between a value of an output signal of the scaling unit 114 and a value of an output signal of the second distortion compensation simulation unit 115.

The approximation error minimization unit 117 calculates a parameter of the second distortion compensation simulation unit 115 so as to minimize an error calculated by the differential unit 116.

The output unit 118 outputs, to the distortion compensation unit 12 as a parameter of the distortion compensation unit 12, the parameter of the second distortion compensation simulation unit 115 calculated by the approximation error minimization unit 117.

Note that, in FIG. 1, a unidirectional arrow directly indicates a direction of a flow of a certain signal (data), and does not exclude bidirectionality (the same in FIGS. 3, 4, 5, 7, 8, 9 and 10 described later).

In addition, the parameter storage unit 112 is not an essential component in the parameter changing device 11, and may be provided outside the parameter changing device 11. In other words, the parameter changing device 11 may be achieved by a minimum configuration including the multiplier 111, the first distortion compensation simulation unit 113, the scaling unit 114, the second distortion compensation simulation unit 115, the differential unit 116, the approximation error minimization unit 117, and the output unit 118.

Hereinafter, the configuration of the parameter changing device 11 will be described in more detail.

First, a back-off rate of the PA 13 and a test signal to be input to the multiplier 111 will be described.

The test signal is a signal having the same characteristic as an input signal of the distortion compensation unit 12 (for example, a signal modulated by the same modulation scheme as the input signal of the distortion compensation unit 12). In addition, the test signal may be the same signal as the input signal of the distortion compensation unit 12.

The back-off rate of the PA 13 is determined according to a communication distance between the transmitter 10 and a receiver (not illustrated), and communication quality of the receiver. Hereinafter, an example of a method of determining the back-off rate will be described.

Step S101:

A spatial attenuation rate is calculated based on a communication distance between the transmitter 10 and the receiver, an appropriate output power (=operation point) as the transmitter 10 is determined based on the calculated spatial attenuation rate, and a back-off rate that becomes the determined output power is set as an initial value of the back-off rate. Thereafter, steps S102 and S103 are repeated with the initial value of the back-off rate as a starting point.

Figure 2:
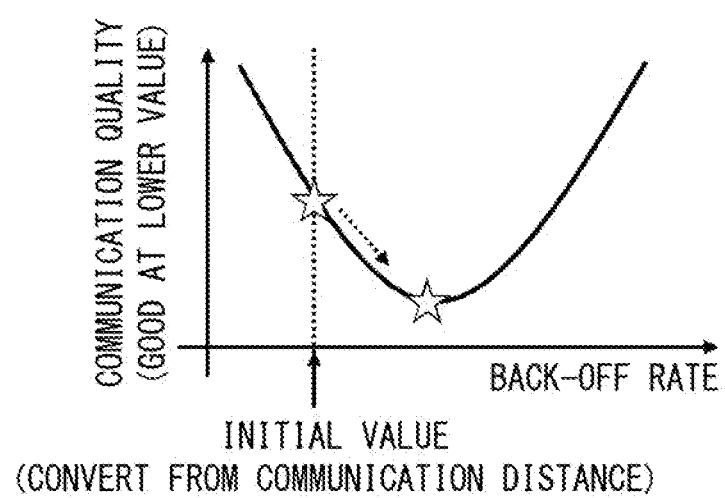
FIG. 2 is a diagram illustrating an example of a method for determining a back-off rate according to the first example embodiment.

Step S102:

The back-off rate is updated by $+\Delta\gamma$, and it is determined whether the communication quality of the receiver improves. When the communication quality improves, update of the back-off rate is reflected, and processing returns to step S102. On the other hand, when the communication quality does not improve, the back-off rate is restored (the back-off rate is changed by $-\Delta\gamma$), and the processing proceeds to step S103. FIG. 2 illustrates a scene where the back-off rate is changed by $+\Delta\gamma$ from the initial value and the communication quality of the receiver is improved. Note that, FIG. 2 is an example that the lower a value of the communication quality is, the better the communication quality is.

Step S103:

The back-off rate is updated by $-\Delta\gamma$, and it is determined whether the communication quality of the receiver improves. When the communication quality improves, update of the back-off rate is reflected and processing returns to step S102. On the other hand, when the communication quality does not improve, the back-off rate is restored (the backoff rate is changed by $+\Delta\gamma$), and the processing returns to step S102.

As described above, in steps S101 to S103, the back-off rate at which a value of the communication quality of the receiver becomes a minimum is searched for by a so-called descent method. Then, the back-off rate at which the value of the communication quality becomes the minimum is input to the multiplier 111.

Note that, determination of the back-off rate may be performed by a user. In this case, a user may determine the back-off rate as described above, input the determined back-off rate together with the test signal to the multiplier 111, and also input the test signal to the second distortion compensation simulation unit 115.

Figure 3:
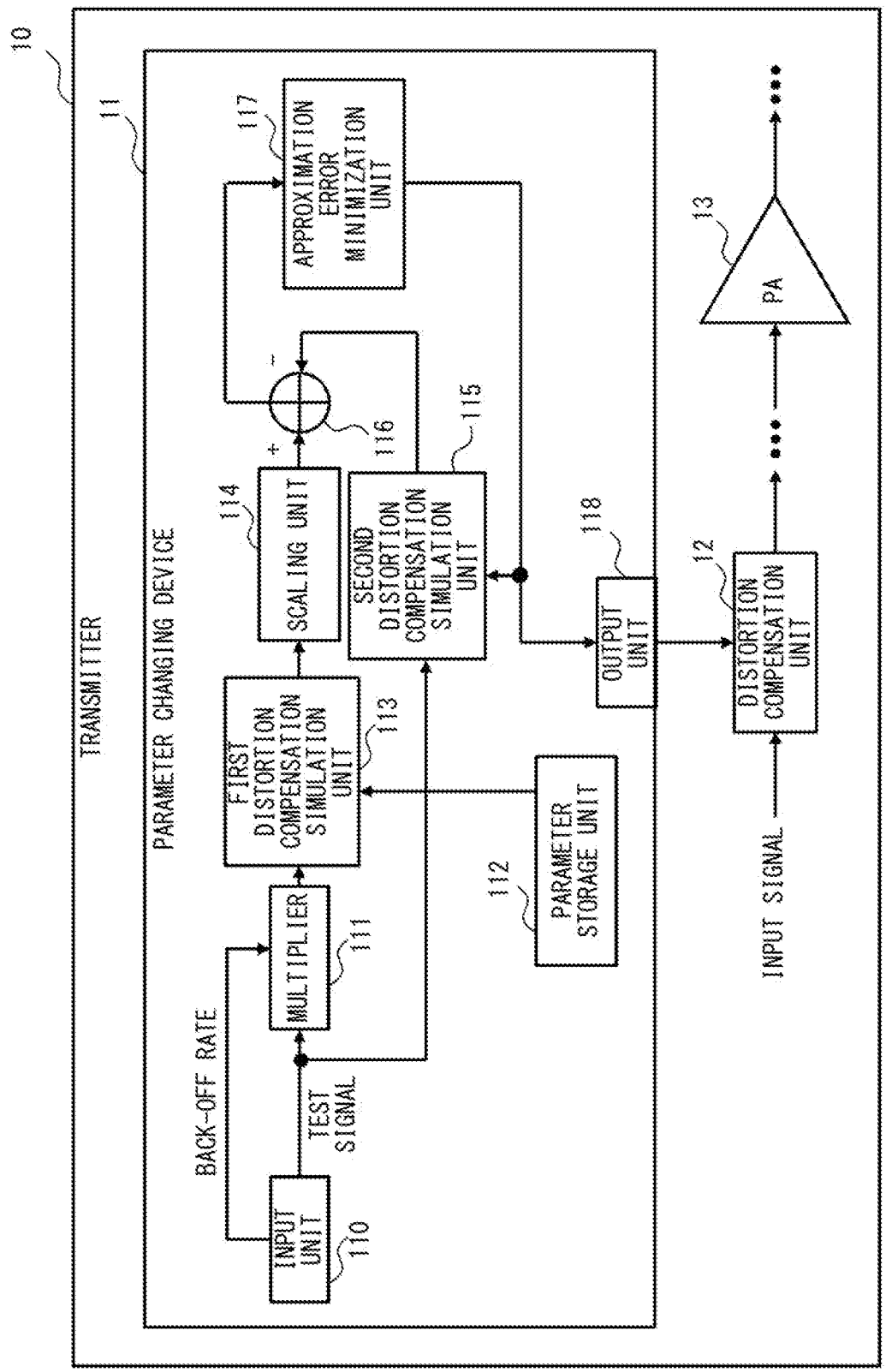
FIG. 3 is a diagram illustrating a modified configuration example of the transmitter according to the first example embodiment.

Alternatively, as illustrated in FIG. 3, the determination of the back-off rate may be performed by an input unit 110 provided in a preceding stage of the multiplier 111. In this case, the input unit 110 may determine the back-off rate as described above, input the determined back-off rate together with the test signal to the multiplier 111, and also input the test signal to the second distortion compensation simulation unit 115.

Figure 4:
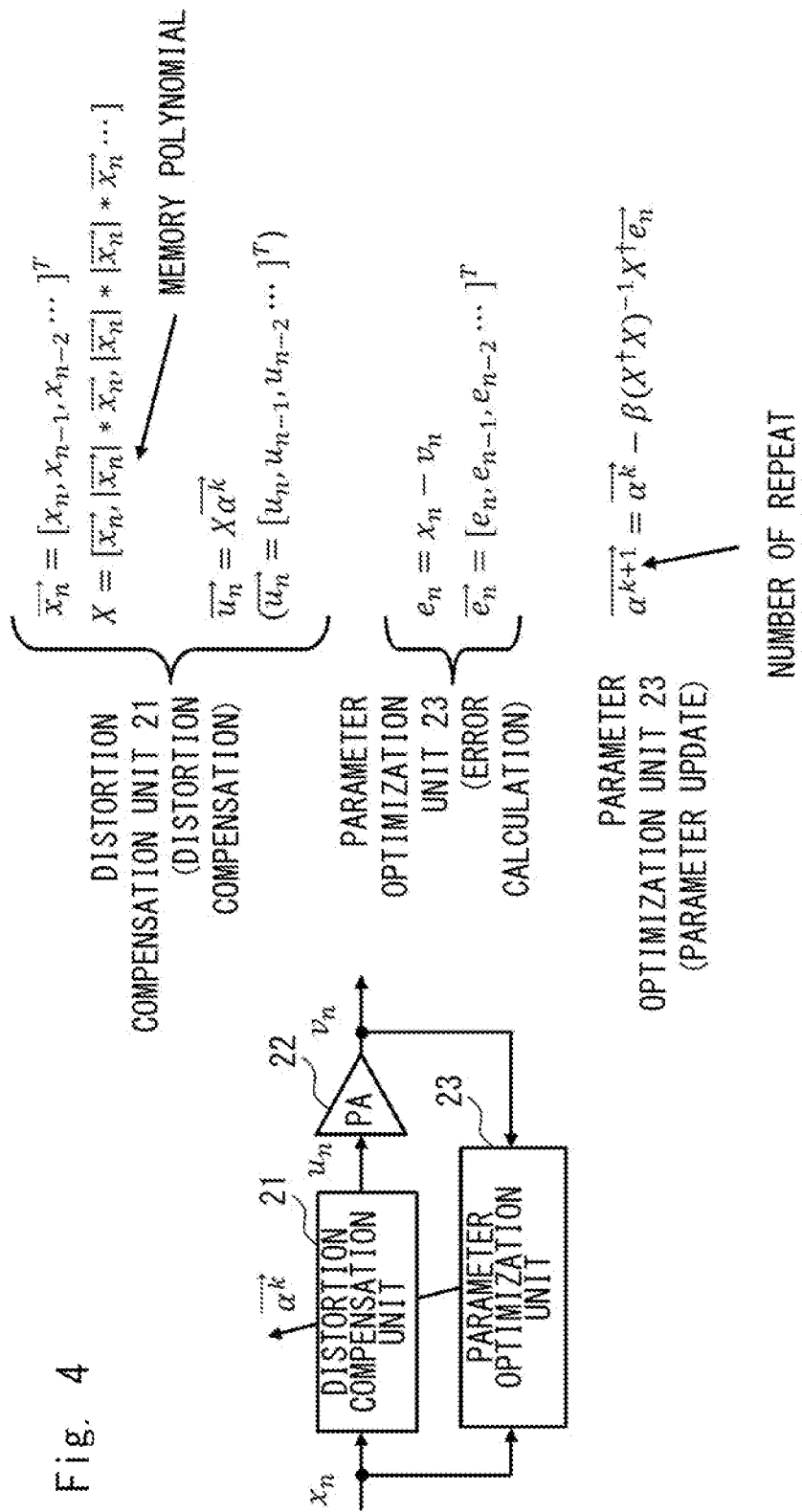
FIG. 4 is a diagram illustrating a configuration example of a circuit for determining a parameter of a first distortion compensation simulation unit and an example of an arithmetic operation content performed by each component of the circuit according to the first example embodiment.

Next, a parameter of the first distortion compensation simulation unit 113 stored in the parameter storage unit 112 will be described with reference to FIG. 4. FIG. 4 illustrates a configuration example of a circuit for determining a parameter of the first distortion compensation simulation unit 113 and an example of an arithmetic operation content performed by each component of the circuit.

The circuit illustrated in FIG. 4 includes a distortion compensation unit 21, a PA 22, and a parameter optimization unit 23. Note that, in FIG. 4, it is assumed that the distortion compensation unit 21 is configured by a memory polynomial. As illustrated in FIG. 4, the following signal sequence $\vec{x_n}$ including a signal $x_n$ in time n, and a past signal sequence is input in the distortion compensation unit 21.

$$\vec{x_n} = [x_n, x_{n-1}, x_{n-2} \ldots]^T$$

The distortion compensation unit 21 performs distortion compensation processing on the signal $x_n$ by using a parameter $\alpha^k$. As a result, the distortion compensation unit 21 acquires the following $u_n$.

$$\vec{u_n} = X\vec{\alpha^k}$$

$$\vec{u_n} = [u_n, u_{n-1}, u_{n-2} \ldots]^T)$$

Herein, an arithmetic matrix X is expressed as follows.

$$X = [\vec{x_n}, |\vec{x_n}| * \vec{x_n}, |\vec{x_n}| * |\vec{x_n}| * \vec{x_n} \ldots]$$

Wherein, $$|\vec{x_n}| = [|x_n|, |x_{n-1}|, |x_{n-2}| \ldots]^T$$

is true. Herein, a symbol * means a product of components of a vector (the same applies in the present disclosure hereinafter), and a result of the vector arithmetic operation is returned as follows.

$$[a_1, a_2, a_3, a_4]^T * [b_1, b_2, b_3, b_4]^T = [a_1 b_1, a_2 b_2, a_3 b_3, a_4 b_4]$$

The parameter optimization unit 23 performs a delay adjustment on the signal $x_n$ and a signal to be output from the PA 22 in such a way as to synchronize with the signal $x_n$, and then calculates an error between the signal $x_n$ and a value $v_n$ scaled in such a way that a power level matches. As a result, the parameter optimization unit 23 acquires the following error $e_n$.

$$e_n = x_n - v_n$$

$$\vec{e_n} = [e_n, e_{n-1}, e_{n-2} \ldots]^T$$

Further, the parameter optimization unit 23 updates the parameter $\alpha^k$ by using the error $e_n$. As a result, the parameter optimization unit 23 acquires the following parameter $\alpha^{k+1}$.

$$\vec{\alpha^{k+1}} = \vec{\alpha^k} - \beta(X^\dagger X)^{-1} X^\dagger \vec{e_n}$$

Wherein, $\dagger$ is an operator that performs a conjugate transposition of a matrix.

Note that, the arithmetic operation illustrated in FIG. 4 is described in, for example, Non Patent Literature 2.

Non Patent Literature 2

R. N. Braithwaite, "Closed-loop digital predistortion (DPD) using an observation path with limited bandwidth", IEEE Trans. Microw. Theory Techn., vol. 63, no. 2, pp. 726-736, February 2015.

In the circuit illustrated in FIG. 4, the arithmetic operation illustrated in FIG. 4 is repeated until a parameter $\alpha$ converges. When the parameter $\alpha$ converges, the converged parameter $\alpha$ is stored in the parameter storage unit 112.

Figure 5:
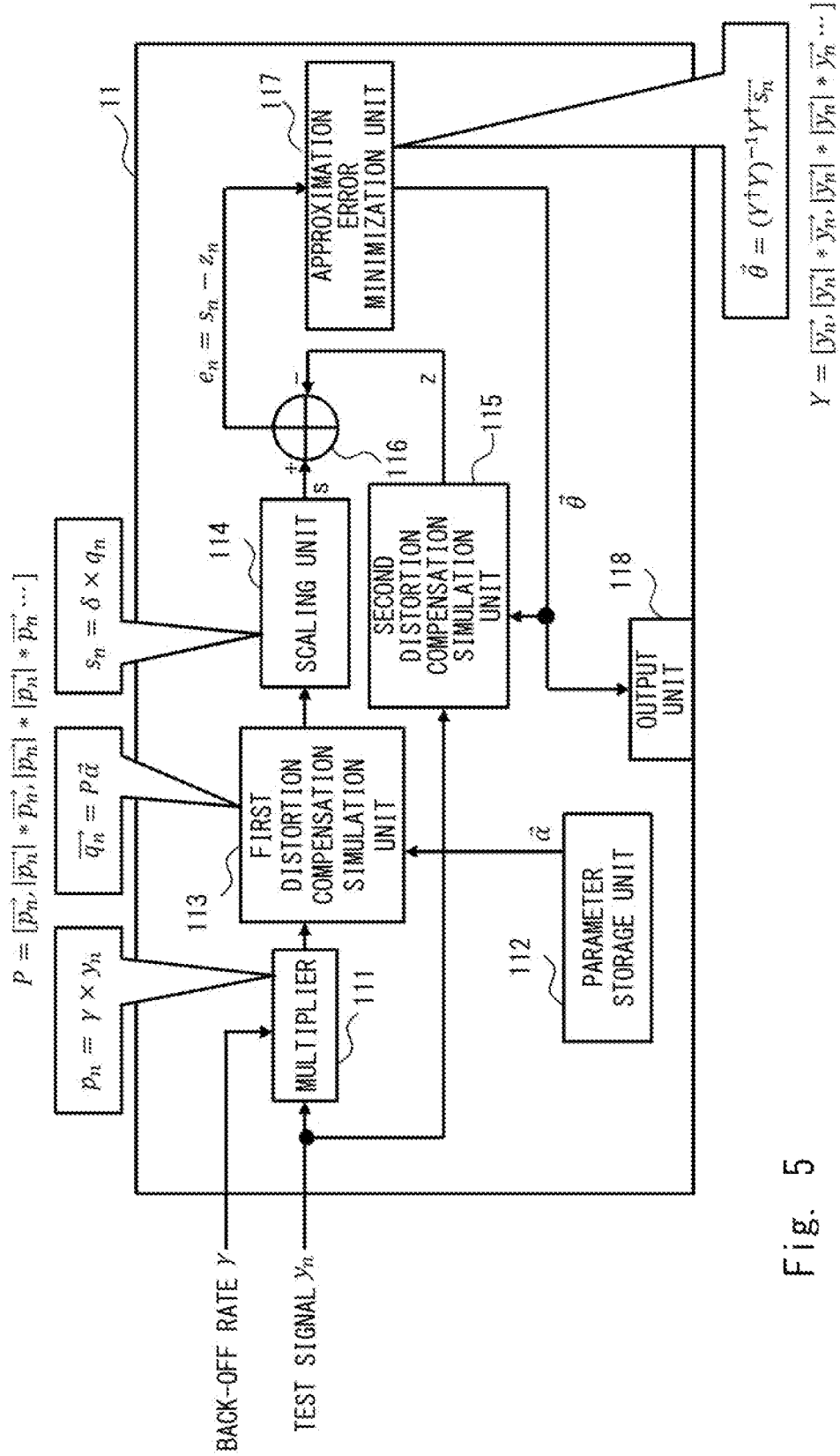
FIG. 5 is a diagram illustrating an example of an arithmetic operation content of each component in a parameter changing device according to the first example embodiment.

Next, with reference to FIG. 5, an example of an arithmetic operation content of each component in the parameter changing device 11 will be described. Note that, in FIG. 5, it is assumed that the back-off rate of the PA 13 is $\gamma$ and the test signal is $y_n$.

The multiplier 111 multiplies the test signal $y_n$ by the back-off rate $\gamma$. As a result, the multiplier 111 acquires the following signal $p_n$.

$$p_n = \gamma \times y_n$$

The first distortion compensation simulation unit 113 performs distortion compensation processing on the signal $p_n$ output from the multiplier 111, by using the parameter $\alpha$ stored in the parameter storage unit 112. As a result, the first distortion compensation simulation unit 113 acquires the following signal $q_n$.

$$X^\dagger \vec{e_n} = P \vec{\alpha}$$

Herein, an arithmetic matrix P is expressed as follows.

$$P = [\vec{p_n}, |\vec{p_n}| * \vec{p_n}, |\vec{p_n}| * |\vec{p_n}| * \vec{p_n} \ldots]$$

Wherein, $$|\vec{p_n}| = [|p_n|, |p_{n-1}|, |p_{n-2}| \ldots]^T$$

is true.

The scaling unit 114 scales the signal $q_n$ output from the first distortion compensation simulation unit 113. As a result, the scaling unit 114 acquires the following signal $s_n$.

$$s_n = \delta \times q_n$$

The second distortion compensation simulation unit 115 performs distortion compensation processing on the test signal $y_n$, by using a parameter $\theta$ calculated by the approximation error minimization unit 117. As a result, the second distortion compensation simulation unit 115 acquires the following signal $z_n$.

$$\vec{z_n} = Y\vec{\theta}$$

Herein, an arithmetic matrix Y is expressed as follows.

$$Y = [\vec{y_n}, |\vec{y_n}| * \vec{y_n}, |\vec{y_n}| * |\vec{y_n}| * \vec{y_n} \ldots]$$

Wherein, $$|\vec{y_n}| = [|y_n|, |y_{n-1}|, |y_{n-2}| \ldots]^T$$

is true.

The differential unit 116 calculates an error between a value of the signal $s_n$ to be output from the scaling unit 114 and a value of the signal $z_n$ to be output from the second distortion compensation simulation unit 115. As a result, the differential unit 116 acquires the following error $e_n$.

$$e_n = s_n - z_n$$

The approximation error minimization unit 117 performs the following arithmetic operation, and calculates the parameter θ of the second distortion compensation simulation unit 115 so as to minimize the error $e_n$ output from the differential unit 116.

$$\hat{\theta} = (Y^\dagger Y)^{-1} Y^\dagger \vec{s_n}$$

The above-described arithmetic operation performed by the approximation error minimization unit 117 is an arithmetic operation for minimizing the following.

$$\vec{e_n}$$

The output unit 118 outputs, to the distortion compensation unit 12 as a parameter of the distortion compensation unit 12, the parameter θ of the second distortion compensation simulation unit 115 calculated by the approximation error minimization unit 117.

Note that, in the first example embodiment, an example in which the distortion compensation unit 12, the first distortion compensation simulation unit 113, and the second distortion compensation simulation unit 115 are configured by a memory polynomial has been described, but the present disclosure is not limited thereto.

For example, an arithmetic matrix of the memory polynomial (for example, the arithmetic matrices X, Y, and P described above) can be replaced with an arithmetic operation of a neural network, and also a least squares method used in the first example embodiment can be replaced with learning (back propagation) used in the neural network.

Therefore, the distortion compensation unit 12, the first distortion compensation simulation unit 113, and the second distortion compensation simulation unit 115 may be configured by a neural network. A distortion compensation unit of the DPD system configured by a neural network is described in Non Patent Literatures 3 and 4, for example.

Non Patent Literature 3

Meenakshi Rawat, Fadhel M. Ghannouchi, "A Mutual Distortion and Impairment Compensator for Wideband Direct-Conversion Transmitters Using Neural Networks", IEEE Transaction on Broadcast, Vol. 58 No. 2, pp. 168-177, June 2012

Non Patent Literature 4

M. Tanio, N. Ishii and N. Kamiya, "Efficient Digital Predistortion Using Sparse Neural Network", in IEEE Access, vol. 8, pp. 117841-117852, 2020, doi: 10.1109/ACCESS.2020.3005146.

Hereinafter, an example of a flow of a schematic operation of the parameter changing device 11 will be described with reference to FIG. 6.

Figure 6:
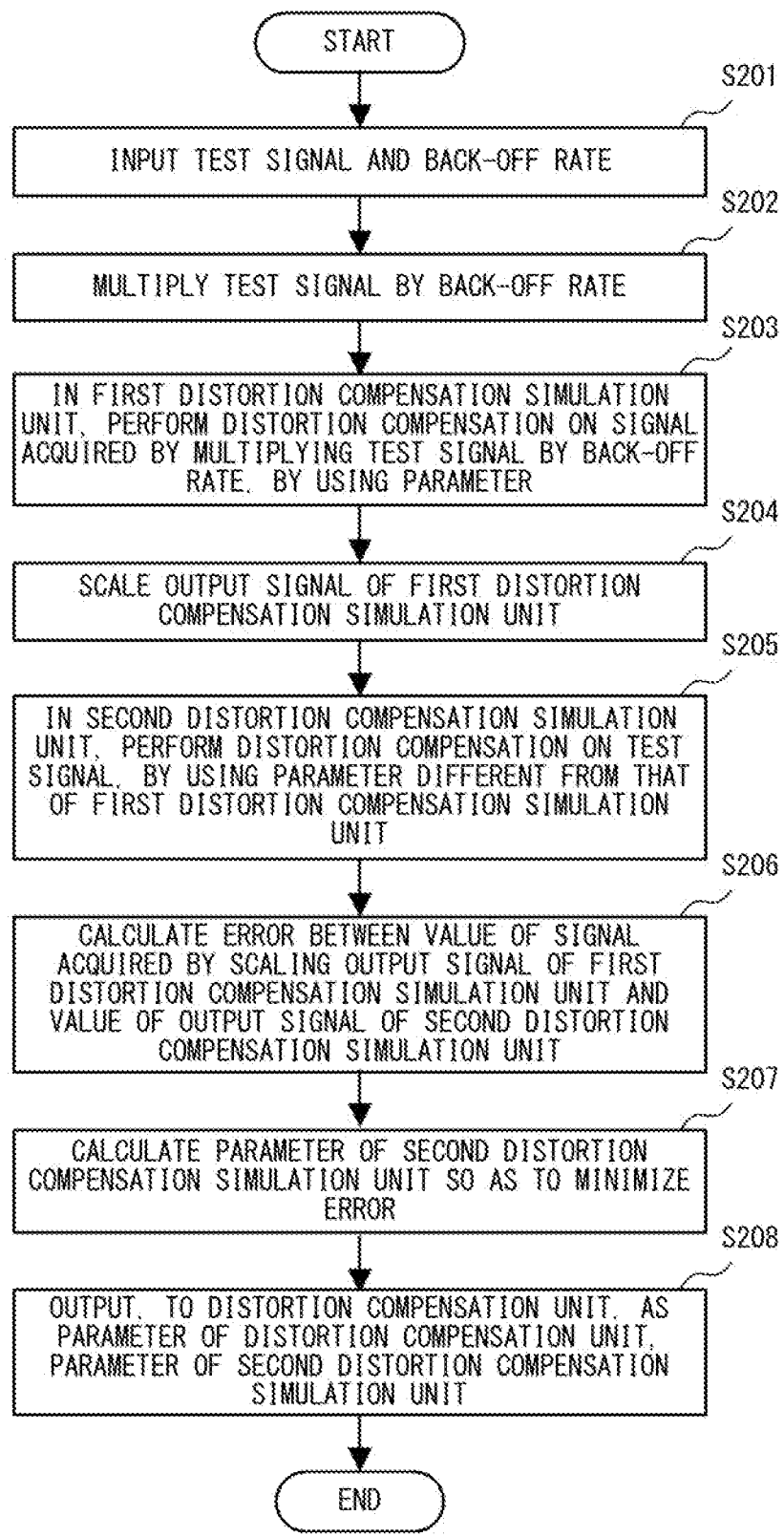
FIG. 6 is a flowchart illustrating an example of a flow of a schematic operation of the parameter changing device according to the first example embodiment.

As illustrated in FIG. 6, first, a back-off rate of the PA 13 and a test signal are input to the parameter changing device 11 (step S201).

Next, the multiplier 111 multiplies the test signal by the back-off rate of the PA 13 (step S202).

Next, the first distortion compensation simulation unit 113 performs distortion compensation processing on an output signal of the multiplier 111, by using a parameter stored in the parameter storage unit 112 (step S203).

Next, the scaling unit 114 scales an output signal of the first distortion compensation simulation unit 113 (step S204).

Next, the second distortion compensation simulation unit 115 performs distortion compensation processing on the test signal, by using a parameter different from that of the first distortion compensation simulation unit 113 (step S205).

Note that, steps S203 and S204, and step S205 are not limited to being performed in this order, and may be performed in reverse order or may be performed at almost the same time in parallel.

Next, the differential unit 116 calculates an error between a value of an output signal of the scaling unit 114 and a value of an output signal of the second distortion compensation simulation unit 115 (step S206).

Next, the approximation error minimization unit 117 calculates a parameter of the second distortion compensation simulation unit 115 so as to minimize the error calculated by the differential unit 116 (step S207).

Thereafter, the output unit 118 outputs, to the distortion compensation unit 12 as a parameter of the distortion compensation unit 12, the parameter of the second distortion compensation simulation unit 115 calculated by the approximation error minimization unit 117 (step S208).

As described above, according to the first example embodiment, the first distortion compensation simulation unit 113 performs distortion compensation processing on a signal acquired by multiplying a test signal by a back-off rate of the PA 13, by using a parameter stored in the parameter storage unit 112. The second distortion compensation simulation unit 115 performs distortion compensation processing on the test signal, by using a parameter different from that of the first distortion compensation simulation unit 113. The differential unit 116 calculates an error between a value of a signal acquired by scaling an output signal of the first distortion compensation simulation unit 113 and a value of an output signal of the second distortion compensation simulation unit 115. The approximation error minimization unit 117 calculates a parameter of the second distortion compensation simulation unit 115 so as to minimize the calculated error. The output unit 118 outputs, to the distortion compensation unit 12 as a parameter of the distortion compensation unit 12, the calculated parameter of the second distortion compensation simulation unit 115.

As a result, it is possible to change a parameter of the distortion compensation unit 12 without providing a feedback circuit as illustrated in FIG. 12. In addition, since there is no need to provide a feedback circuit, it is possible to avoid an increase in a cost of the transmitter 10.

Second Example Embodiment

Figure 7:
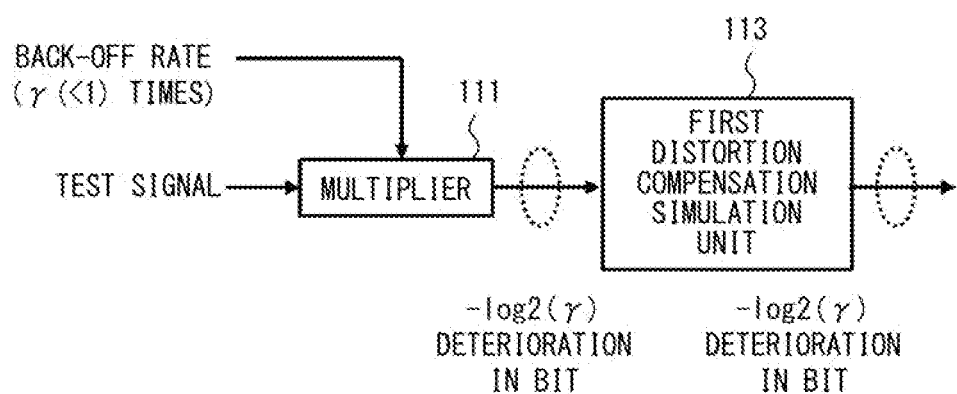
FIG. 7 is an enlarged configuration diagram illustrating the periphery of the first distortion compensation simulation unit according to the first example embodiment.

FIG. 7 is an enlarged configuration diagram of the periphery of the first distortion compensation simulation unit 113 according to the first example embodiment described above.

As illustrated in FIG. 7, in the first example embodiment described above, the multiplier 111 in the preceding stage of the first distortion compensation simulation unit 113 multiplies a test signal by a back-off rate. Therefore, change of an operation point (=power scaling) of the first distortion compensation simulation unit 113 is performed.

However, many pieces of signal processing of wireless communication such as mobile communication is performed by a fixed-point arithmetic operation because of a demand of operating speed and a circuit scale.

Therefore, accuracy of a signal at an input stage and an output stage of the first distortion compensation simulation unit 113 may be lost due to the change of the operation point of the first distortion compensation simulation unit 113.

Specifically, when a back-off rate γ is γ<1 (that is, when the power scaling is less than 1), bit accuracy of a signal deteriorates by −log 2(γ) in the input stage and the output stage of the first distortion compensation simulation unit 113.

As a result, accuracy of a parameter of the distortion compensation unit 12 to be calculated by the approximation error minimization unit 117 deteriorates, which in turn leads to deterioration in compensation accuracy of the distortion compensation unit 12.

A second example embodiment is an example of suppressing deterioration in accuracy of a parameter of a distortion compensation unit 12 caused by deterioration in bit accuracy of a signal at an input stage and an output stage of a first distortion compensation simulation unit 113.

Hereinafter, a configuration example of a transmitter 10A according to the second example embodiment will be described with reference to FIG. 8.

Figure 8:
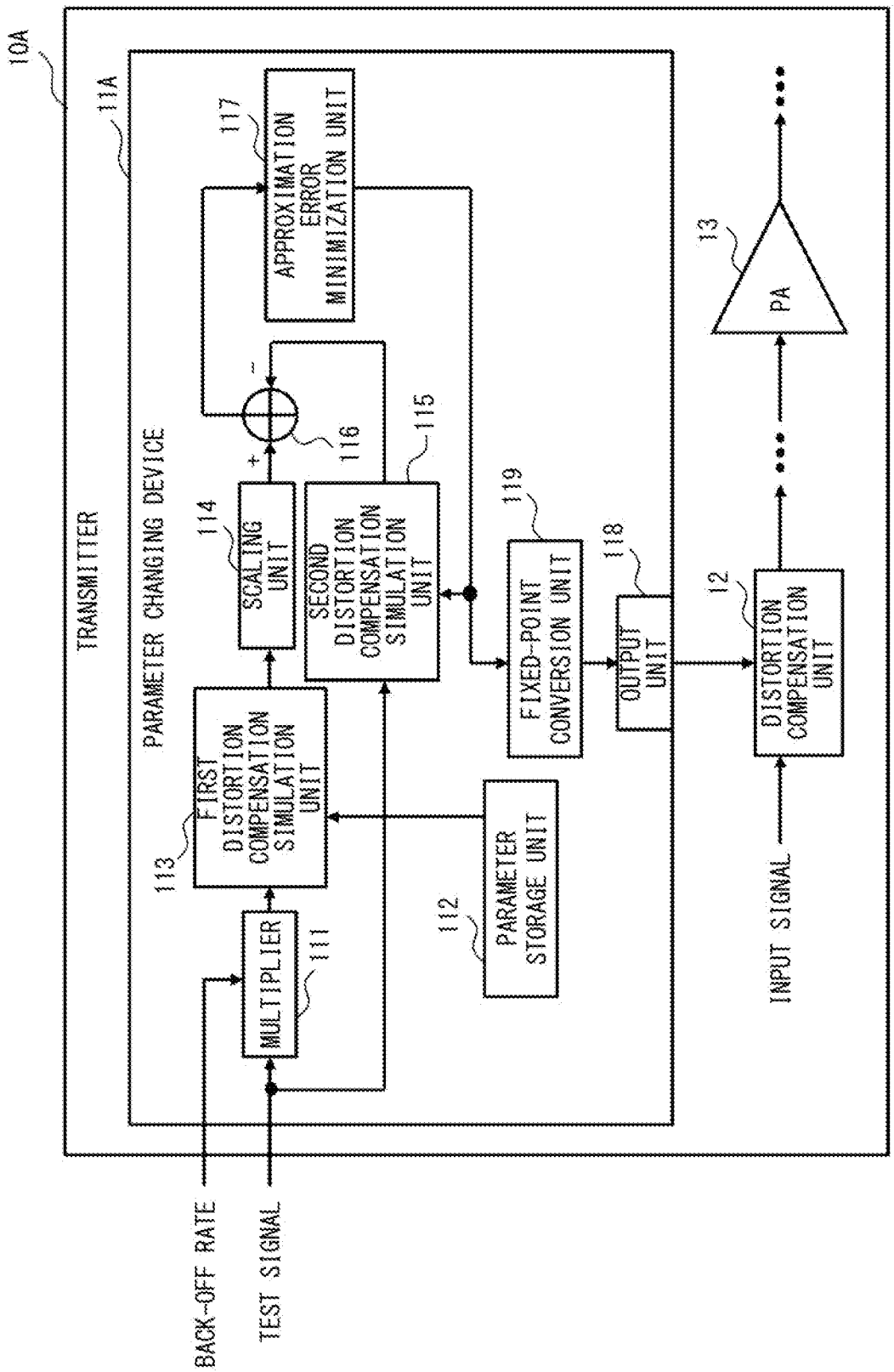
FIG. 8 is a diagram illustrating a configuration example of a transmitter according to a second example embodiment.

As illustrated in FIG. 8, the transmitter 10A according to the second example embodiment is different from the transmitter 10 according to the first example embodiment described above in that the parameter changing device 11 is replaced with a parameter changing device 11A.

In addition, the parameter changing device 11A according to the second example embodiment is different from the parameter changing device 11 according to the first example embodiment described above in that a fixed-point conversion unit 119 is added in a preceding stage of an output unit 118.

In the second example embodiment, a multiplier 111, a parameter storage unit 112, the first distortion compensation simulation unit 113, a scaling unit 114, a second distortion compensation simulation unit 115, a differential unit 116, and an approximation error minimization unit 117 perform the above-described arithmetic operation by a floating-point arithmetic operation. As a result, it is possible to suppress deterioration in bit accuracy of a signal at an input stage and an output stage of the first distortion compensation simulation unit 113.

In addition, since the approximation error minimization unit 117 also performs a floating-point arithmetic operation, a parameter of the second distortion compensation simulation unit 115 calculated by the approximation error minimization unit 117 is a parameter expressed in a floating-point format.

However, since a distortion compensation unit 12 is a component that performs signal processing of wireless communication, distortion compensation processing is performed by a fixed-point arithmetic operation.

Therefore, in the second example embodiment, the fixed-point conversion unit 119 provided in the preceding stage of the output unit 118 converts a parameter of the second distortion compensation simulation unit 115 expressed in the floating-point format into a parameter expressed in a fixed-point format. Then, the output unit 118 outputs, to the distortion compensation unit 12 as a parameter of the distortion compensation unit 12, the parameter of the second distortion compensation simulation unit 115 expressed in the fixed-point format. As a result, the distortion compensation unit 12 performing the fixed-point arithmetic operation can use the parameter of the second distortion compensation simulation unit 115, and therefore it is possible to suppress the deterioration in compensation accuracy of the distortion compensation unit 12.

As described above, according to the second example embodiment, the multiplier 111, the parameter storage unit 112, the first distortion compensation simulation unit 113, the scaling unit 114, the second distortion compensation simulation unit 115, the differential unit 116, and the approximation error minimization unit 117 perform the floating-point arithmetic operation. The fixed-point conversion unit 119 converts a parameter of the second distortion compensation simulation unit 115 expressed in the floating-point format into a parameter expressed in the fixed-point format. The output unit 118 outputs, to the distortion compensation unit 12 as a parameter of the distortion compensation unit 12, the parameter of the second distortion compensation simulation unit 115 expressed in the fixed-point format.

As a result, it is possible to suppress deterioration in bit accuracy of a signal at the input stage and the output stage of the first distortion compensation simulation unit 113, and also the distortion compensation unit 12 can use the parameter of the second distortion compensation simulation unit 115 by conversion by the fixed-point conversion unit 119, and therefore it is possible to suppress deterioration in compensation accuracy of the distortion compensation unit 12.

Other advantageous effects are similar to those of the first example embodiment described above.

Third Example Embodiment

Although the transmitters 10 and 10A according to the first and second example embodiments described above are provided with only one PA 13, the present disclosure is also applicable to a transmitter in which PAs are configured in multiple stages.

A third example embodiment is an example in which the present disclosure is applied to a transmitter provided with PAs having a two-stage configuration.

Hereinafter, a configuration example of a transmitter 10B according to the third example embodiment will be described with reference to FIG. 9.

Figure 9:
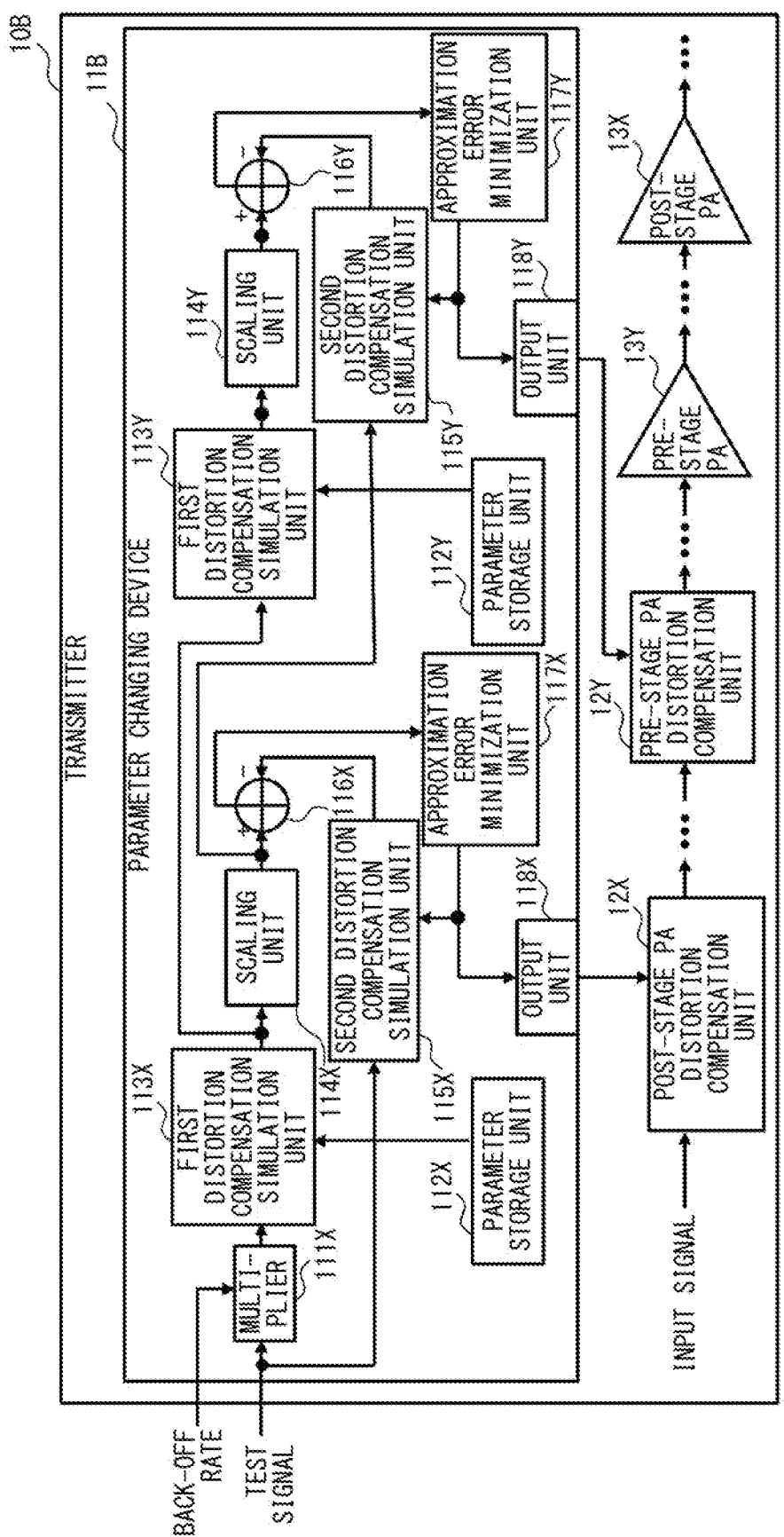
FIG. 9 is a diagram illustrating a configuration example of a transmitter according to a third example embodiment.

As illustrated in FIG. 9, the transmitter 10B according to the third example embodiment includes a parameter changing device 11B, a post-stage PA distortion compensation unit 12X, a pre-stage PA distortion compensation unit 12Y, a post-stage PA 13X, and a pre-stage PA 13Y.

The post-stage PA distortion compensation unit 12X and the pre-stage PA distortion compensation unit 12Y correspond to the distortion compensation unit 12 according to the first example embodiment described above. The post-stage PA 13X and the pre-stage PA 13Y correspond to the PA 13 according to the first example embodiment described above.

The post-stage PA distortion compensation unit 12X performs distortion compensation processing of compensating for nonlinear distortion of the post-stage PA 13X on an input signal by using a parameter. The input signal corresponds to an output signal of the signal processing unit 91 illustrated in FIG. 12.

The pre-stage PA distortion compensation unit 12Y performs distortion compensation processing of compensating for nonlinear distortion of the pre-stage PA 13Y on a signal to be input, by using a parameter.

The parameter changing device 11B is a device that changes parameters of the post-stage PA distortion compensation unit 12X and the pre-stage PA distortion compensation unit 12Y, by using a back-off rate of the post-stage PA 13X and the pre-stage PA 13Y and a test signal to be input, and outputs the changed parameters to the post-stage PA distortion compensation unit 12X and the pre-stage PA distortion compensation unit 12Y.

The parameter changing device 11B includes a multiplier 111X, a parameter storage unit 112X, a first distortion compensation simulation unit 113X, a scaling unit 114X, a second distortion compensation simulation unit 115X, a differential unit 116X, an approximation error minimization unit 117X, an output unit 118X, a parameter storage unit 112Y, a first distortion compensation simulation unit 113Y, a scaling unit 114Y, a second distortion compensation simulation unit 115Y, a differential unit 116Y, an approximation error minimization unit 117Y, and an output unit 118Y.

The multiplier 111X corresponds to the multiplier 111 according to the first example embodiment described above. The parameter storage units 112X and 112Y correspond to the parameter storage unit 112 according to the first example embodiment described above. The first distortion compensation simulation units 113X and 113Y correspond to the first distortion compensation simulation unit 113 according to the first example embodiment described above. The scaling units 114X and 114Y correspond to the scaling unit 114 according to the first example embodiment described above. The second distortion compensation simulation units 115X and 115Y correspond to the second distortion compensation simulation unit 115 according to the first example embodiment described above. The differential units 116X and 116Y correspond to the differential unit 116 according to the first example embodiment described above. The approximation error minimization units 117X and 117Y correspond to the approximation error minimization unit 117 according to the first example embodiment described above. The output units 118X and 118Y correspond to the output unit 118 according to the first example embodiment described above.

The multiplier 111X multiplies a test signal to be input by back-off rates of the post-stage PA 13X and the pre-stage PA 13Y to be input.

The parameter storage unit 112X stores a parameter of the first distortion compensation simulation unit 113X.

The first distortion compensation simulation unit 113X performs distortion compensation processing on an output signal of the multiplier 111X, by using a parameter stored in the parameter storage unit 112X.

The second distortion compensation simulation unit 115X performs distortion compensation processing on a test signal to be input, by using a parameter different from that of the first distortion compensation simulation unit 113X.

The scaling unit 114X scales an output signal of the first distortion compensation simulation unit 113X.

The differential unit 116X calculates an error between a value of an output signal of the scaling unit 114X and a value of an output signal of the second distortion compensation simulation unit 115X.

The approximation error minimization unit 117X calculates a parameter of the second distortion compensation simulation unit 115X so as to minimize the error calculated by the differential unit 116X.

The output unit 118X outputs, to the post-stage PA distortion compensation unit 12X as a parameter of the post-stage PA distortion compensation unit 12X, the parameter of the second distortion compensation simulation unit 115X calculated by the approximation error minimization unit 117X.

The parameter storage unit 112Y stores a parameter of the first distortion compensation simulation unit 113Y.

The first distortion compensation simulation unit 113Y performs distortion compensation processing on an output signal of the first distortion compensation simulation unit 113X to be input, by using a parameter stored in the parameter storage unit 112Y.

The second distortion compensation simulation unit 115Y performs distortion compensation processing on an output signal of the scaling unit 114X to be input, by using a parameter different from that of the first distortion compensation simulation unit 113Y.

The scaling unit 114Y scales an output signal of the first distortion compensation simulation unit 113Y.

The differential unit 116Y calculates an error between a value of an output signal of the scaling unit 114Y and a value of an output signal of the second distortion compensation simulation unit 115Y.

The approximation error minimization unit 117Y calculates a parameter of the second distortion compensation simulation unit 115Y so as to minimize the error calculated by the differential unit 116Y.

The output unit 118Y outputs, to the pre-stage PA distortion compensation unit 12Y as a parameter of the pre-stage PA distortion compensation unit 12Y, the parameter of the second distortion compensation simulation unit 115Y calculated by the approximation error minimization unit 117Y.

Since the third example embodiment is configured as described above, the third example embodiment can be applied to the transmitter 10B provided with the post-stage PA 13X and the pre-stage PA 13Y having the two-stage configuration, and parameters of the post-stage PA distortion compensation unit 12X and the pre-stage PA distortion compensation unit 12Y can be changed.

Other advantageous effects are similar to those of the first example embodiment described above.

Fourth Example Embodiment

Although the transmitters 10, 10A, and 10B according to the first, second, and third example embodiments described above are transmitters for wireless communication, but the present disclosure is also applicable to a transmitter for optical communication.

A fourth example embodiment is an example in which the present disclosure is applied to a transmitter for optical communication.

Hereinafter, a configuration example of a transmitter 10C according to the fourth example embodiment will be described with reference to FIG. 10.

Figure 10:
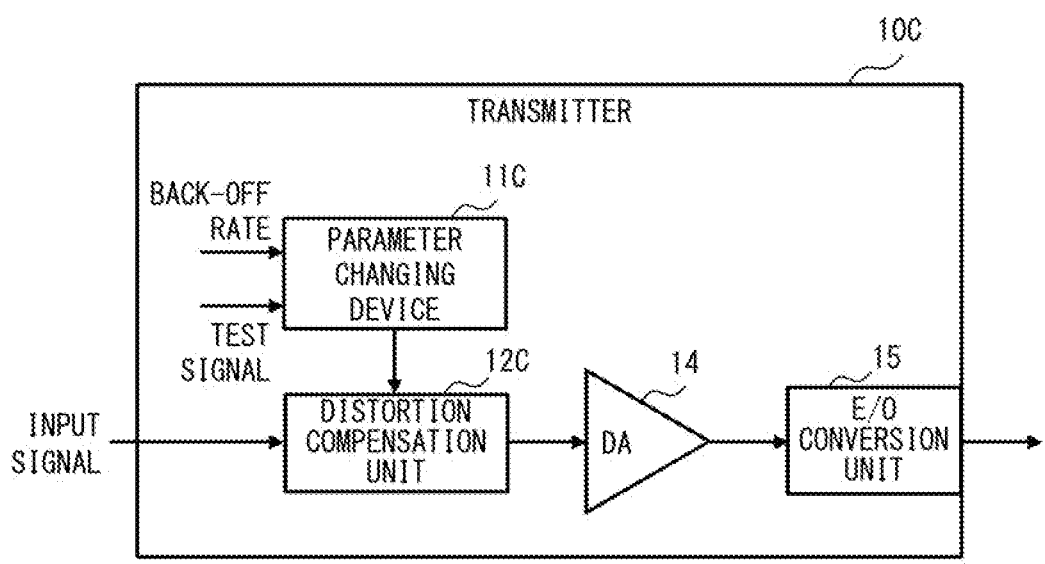
FIG. 10 is a diagram illustrating a configuration example of a transmitter according to a fourth example embodiment.

As illustrated in FIG. 10, the transmitter 10C according to the fourth example embodiment includes a parameter changing device 11C, a distortion compensation unit 12C, a driver amplifier (hereinafter, referred to as "DA" as appropriate) 14, and an electronic/optical (E/O) conversion unit 15.

The parameter changing device 11C corresponds to the parameter changing devices 11 and 11A according to the first and second example embodiments described above. The distortion compensation unit 12C corresponds to the distortion compensation unit 12 according to the first and second example embodiments described above.

The distortion compensation unit 12C performs distortion compensation processing of compensating for nonlinear distortion of the DA 14 on an input signal by using a parameter.

The parameter changing device 11C changes a parameter of the distortion compensation unit 12C, by using a back-off rate of the DA 14 and a test signal to be input, and outputs the changed parameter to the distortion compensation unit 12C.

The DA 14 amplifies an output signal of the distortion compensation unit 12C.

The E/O conversion unit 15 converts an output signal of the DA 14 from an electric signal to an optical signal, and transmits the converted signal to a receiver (not illustrated) via an optical component such as an optical fiber.

Since the fourth example embodiment is configured as described above, the fourth example embodiment can be applied to the transmitter 10C for optical communication, and a parameter of the distortion compensation unit 12C can be changed.

Other advantageous effects are similar to those of the first example embodiment described above.

Fifth Example Embodiment

A configuration example of a parameter changing device 11D according to a fifth example embodiment will be described with reference to FIG. 11.

Figure 11:
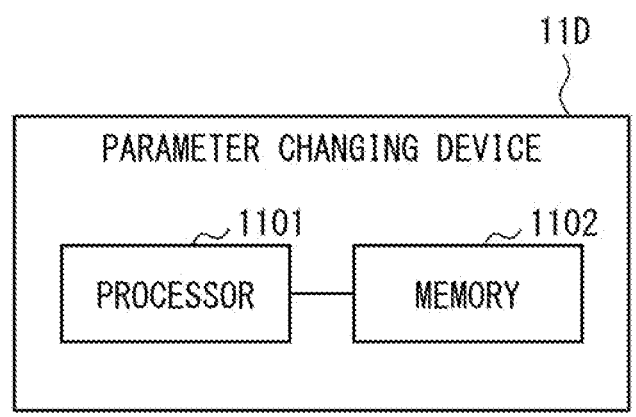
FIG. 11 is a diagram illustrating a configuration example of a parameter changing device according to a fifth example embodiment.

As illustrated in FIG. 11, the parameter changing device 11D according to the fifth example embodiment includes a processor 1101 and a memory 1102.

The processor 1101 may be, for example, a microprocessor, a micro processing unit (MPU), or a central processing unit (CPU). The processor 1101 may include a plurality of processors.

The memory 1102 is configured by a combination of a volatile memory and a non-volatile memory. The memory 1102 may include a storage located away from the processor 1101. In this case, the processor 1101 may access the memory 1102 via a not-illustrated input/output (I/O) interface.

The parameter changing devices 11, 11A, 11B, and 11C according to the first, second, third, and fourth example embodiments described above may have a hardware configuration illustrated in FIG. 11. A program is stored in the memory 1102. The program includes a group of instructions (or software code) that, when being loaded into a computer, cause the computer to execute one or more of functions described in the example embodiments described above. Components of the parameter changing devices 11, 11A, 11B, and 11C described above may be achieved by the processor 1101 reading and executing a program stored in the memory 1102. In addition, a storage function in the parameter changing devices 11, 11A, 11B, and 11C described above may be achieved by the memory 1102.

In addition, the program described above may be stored in a non-transitory computer readable medium or a tangible storage medium. By way of example, and not limitation, non-transitory computer readable media or tangible storage media include a random-access memory (RAM), a read-only memory (ROM), a flash memory, a solid-state drive (SSD), or another memory technique, a CD-ROM, a digital versatile disc (DVD), a Blu-ray (registered trademark) disk, or another optical disk storage, a magnetic cassette, a magnetic tape, a magnetic disk storage, or another magnetic storage device. The program may be transmitted on a transitory computer readable medium or a communication medium. By way of example, and not limitation, transitory computer readable media or communication media include a propagation signal in electric, optical, acoustic, or another form.

Although the present disclosure has been described with reference to the example embodiments, the present disclosure is not limited to the above-described example embodiments. Various changes that can be understood by a person skilled in the art within the scope of the present disclosure can be made to the configuration and details of the present disclosure.

For example, the example embodiments described above may be applied by combining any two or more example embodiments.

The invention claimed is:

1. A parameter changing device configured to change a parameter of a distortion compensation unit configured to perform distortion compensation processing of compensating for nonlinear distortion of an amplifier, the parameter changing device comprising:
   a multiplier configured to multiply a test signal to be input by a back-off rate to be input;
   a first distortion compensation simulation unit configured to perform distortion compensation processing on an output signal of the multiplier, by using a parameter stored in a parameter storage unit;
   a scaling unit configured to scale an output signal of the first distortion compensation simulation unit;
   a second distortion compensation simulation unit configured to perform distortion compensation processing on the test signal to be input, by using a parameter different from that of the first distortion compensation simulation unit;
   a differential unit configured to calculate an error between a value of an output signal of the scaling unit and a value of an output signal of the second distortion compensation simulation unit;
   an approximation error minimization unit configured to calculate a parameter of the second distortion compensation simulation unit so as to minimize the error calculated by the differential unit; and
   an output unit configured to output, to the distortion compensation unit, as a parameter of the distortion compensation unit, a parameter of the second distortion compensation simulation unit being calculated by the approximation error minimization unit.

2. The parameter changing device according to claim 1, further comprising a fixed-point conversion unit, wherein
   the multiplier, the first distortion compensation simulation unit, the second distortion compensation simulation unit, the scaling unit, the differential unit, and the approximation error minimization unit perform a floating-point arithmetic operation,
   the fixed-point conversion unit converts a parameter of the second distortion compensation simulation unit being expressed in a floating-point format into a parameter expressed in a fixed-point format, and
   the output unit outputs, to the distortion compensation unit, as a parameter of the distortion compensation unit, a parameter of the second distortion compensation simulation unit being converted by the fixed-point conversion unit and expressed in a fixed-point format.

3. The parameter changing device according to claim 1, further comprising an input unit, wherein
   the amplifier, the distortion compensation unit, and the parameter changing device are provided in a transmitter, and
   the input unit determines the back-off rate, based on a communication distance between the transmitter and a receiver and communication quality of the receiver, inputs the determined back-off rate to the multiplier together with the test signal, and inputs the test signal to the second distortion compensation simulation unit.

4. The parameter changing device according to claim 1, wherein the first distortion compensation simulation unit and the second distortion compensation simulation unit perform distortion compensation processing in common with the distortion compensation unit except for a parameter.

5. The parameter changing device according to claim 1, wherein the distortion compensation unit, the first distortion compensation simulation unit, and the second distortion compensation simulation unit are configured by a memory polynomial.

6. The parameter changing device according to claim 1, wherein the distortion compensation unit, the first distortion compensation simulation unit, and the second distortion compensation simulation unit are configured by a neural network.

7. A parameter changing method being provided by a parameter changing device configured to change a parameter of a distortion compensation unit configured to perform distortion compensation processing of compensating for nonlinear distortion of an amplifier, the parameter changing method comprising:
  inputting a back-off rate and a test signal;
  multiplying the test signal by the back-off rate;
  in a first distortion compensation simulation unit, performing distortion compensation processing on a signal acquired by the multiplication, by using a parameter stored in a parameter storage unit;
  scaling an output signal of the first distortion compensation simulation unit;
  in a second distortion compensation simulation unit, performing distortion compensation processing on the test signal, by using a parameter different from that of the first distortion compensation simulation unit;
  calculating an error between a value of a signal acquired by the scaling and a value of an output signal of the second distortion compensation simulation unit;
  calculating a parameter of the second distortion compensation simulation unit so as to minimize the calculated error; and
  outputting, to the distortion compensation unit, as a parameter of the distortion compensation unit, the calculated parameter of the second distortion compensation simulation unit.

8. A non-transitory computer readable medium storing a program for causing a computer to change a parameter of a distortion compensation unit configured to perform distortion compensation processing of compensating for nonlinear distortion of an amplifier, the program including:
  inputting a back-off rate and a test signal;
  multiplying the test signal by the back-off rate;
  in a first distortion compensation simulation unit, performing distortion compensation processing on a signal acquired by the multiplication, by using a parameter stored in a parameter storage unit;
  scaling an output signal of the first distortion compensation simulation unit;
  in a second distortion compensation simulation unit, performing distortion compensation processing on the test signal, by using a parameter different from that of the first distortion compensation simulation unit;
  calculating an error between a value of a signal acquired by the scaling and a value of an output signal of the second distortion compensation simulation unit;
  calculating a parameter of the second distortion compensation simulation unit so as to minimize the calculated error; and
  outputting, to the distortion compensation unit, as a parameter of the distortion compensation unit, the calculated parameter of the second distortion compensation simulation unit.

* * * * *